United States Patent [19]

Schreiber

[11] Patent Number: 4,797,611
[45] Date of Patent: Jan. 10, 1989

[54] BIPARTITE GENERATOR WHEEL FOR AN ANGULAR PULSE GENERATOR

[75] Inventor: Hans Schreiber, Lappersdorf, Fed. Rep. of Germany

[73] Assignee: Siemens Aktiengesellschaft, Berlin and Munich, Fed. Rep. of Germany

[21] Appl. No.: 68,925

[22] Filed: Jul. 1, 1987

[30] Foreign Application Priority Data

Jul. 2, 1986 [DE] Fed. Rep. of Germany ....... 3622214

[51] Int. Cl.⁴ .................................................. G01B 7/30
[52] U.S. Cl. ....................................... 324/208; 74/449; 324/173; 310/168; 307/106
[58] Field of Search ................................. 324/160–179, 324/207, 208, 262; 307/106; 310/168; 74/439, 447, 449

[56] References Cited

U.S. PATENT DOCUMENTS

| | | | |
|---|---|---|---|
| 3,591,849 | 7/1971 | Cavil | 307/106 |
| 4,121,112 | 10/1978 | Hartig | 307/106 |
| 4,143,538 | 3/1979 | Karsh et al. | 324/164 X |

Primary Examiner—Gerard R. Strecker
Assistant Examiner—Warren S. Edmonds
Attorney, Agent, or Firm—Hill, Van Santen, Steadman & Simpson

[57] ABSTRACT

The generator wheel is composed of a tooth part and of a marker part. The tooth part has a rotational axis and a coaxial tooth or toothed edge in the shape of a circular ring with teeth situated distributed over its circumference, some of said teeth being marker teeth which include a recess. The marker part is secured to the tooth part and contains sheet metal strips corresponding in number to the number of marker teeth, said sheet metal strips projecting into said recesses of the marker teeth. Marker part and tooth part are composed of materials having different eddy current losses.

3 Claims, 1 Drawing Sheet sub-areas are bent off at a right angle along the straight line. That part of the surface sections still connected to the circumferential line of the floor 20, finally, is bent off at a right angle along the circumferential line, so that the marker part 2 of FIG. 3 arises.

In this embodiment, the marker part 2 is connected to the tooth part 1 via the floor 20. The marker part 2 is dimensioned such that it can be inserted into the tooth part 1 along the rotational axis 11 and such that the sheet metal strips 21 project into the recesses 133 of the marker teeth 132 (cf. FIG. 4).

In a departure from this embodiment of the invention, the marker part can also be fashioned as a sheet metal cylinder which fits into the toothed part 1 of FIG. 2 and is itself secured to the inner circumference of the tooth part 1. The sheet metal cylinder has L-shaped incisions which proceed from the edge parallel to its rotational axis and then perpendicular thereto, parallel to the cylinder circumference. Rectangularly shaped members arise as a result of these incisions, these members being bent radially out from the cylinder wall and similar to FIG. 3 forming sheet metal strips which fit in the recesses 133 of the marker teeth 132 of the tooth part 1.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A generator wheel for an angular pulse generator, having a rotational axis comprising:
    a sheet metal tooth part having a central region and a toothed edge formed at a circumferential region coaxial to said rotational axis and having a plurality of teeth of which n teeth are fashioned as marker teeth, said marker teeth each including a recess; and
    a marker part connected to said tooth part and having marker members being sheet metal strips formed as an integral part of said marker part, said strips projecting into said recess of said marker teeth, said teeth and said marker members being composed of materials having different eddy current losses.

2. A generator wheel according to claim 1, wherein said toothed edge is formed at an angle between 0° and 180° with respect to a plane perpendicular to said rotational axis.

3. A generator wheel according to claim 1, wherein said recesses extend in an axial direction in said marker teeth.

* * * * *

BIPARTITE GENERATOR WHEEL FOR AN ANGULAR PULSE GENERATOR

BACKGROUND OF THE INVENTION

1. Field of the Invention

The invention is directed to a generator wheel for an angular pulse generator having a rotational axis, a toothed edge coaxial thereto and having teeth of which a number of teeth are fashioned as marker teeth and comprise marker members for this purpose, the teeth and the marker members being composed of materials having different eddy current losses, and a central region surrounded by the toothed edge.

2. Description of the Prior Art

Such a generator wheel is disclosed by U.S. Pat. No. 4,121,112. A generator wheel comprising iron teeth is employed, whereby a piece of ferrite material is secured to at least one tooth, or is introduced into an appertaining depression to be a marker tooth. This ferrite material lowers the eddy current losses of the marker tooth, whereby teeth and marker teeth can be distinguished from one another.

The aforementioned letters patent, however, does not disclose any fastening of the ferrite material to the marker tooth which meets the demands to be made of stability and retainability, particularly given high speeds, as well as to be made of economical manufacture.

SUMMARY OF THE INVENTION

It is therefore an object of the invention to provide a simple structure for such a generator wheel suitable for mass production which can also be utilized under rough operating conditions.

The solution to this problem provided by the invention is that the central region and the toothed edge form a tooth part shaped of sheet metal, the marker teeth each including a recesses and which are a component part of a marker part of the sheet metal which is connected to the tooth part. In accord therewith, the generator wheel comprises two sheet metal parts connected to one another, namely a toothed part and a marker part. The toothed part carries the teeth arranged on a circular orbit around a rotational axis, some of these teeth being marker teeth that have a recess. The marker part includes marking members in the form of sheet metal strips which are bent such that they project into the recesses of the marker teeth of the tooth part.

The toothed part and the marker part are fabricated of different materials, so that teeth and marker teeth can be distinguished from one another on the basis of their eddy current losses.

The tooth part is divided into a central region which, dependent on the location at which it is built in, can be a circular surface or a conical surface. A gear wheel in which the teeth and the marker teeth lie coaxially joins the central region. The position of the gear wheel is defined by a boundary angle α which it describes with a plane perpendicular to the rotational axis.

BRIEF DESCRIPTION OF THE DRAWINGS

A preferred exemplary embodiment of the invention shall be set forth in greater detail with reference to FIGS. 1 through 4. Thereby shown are.

DESCRIPTION OF THE PREFERRED EMBODIMENTS

Figure 1:
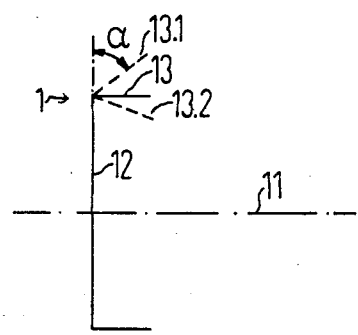
FIG. 1 is a schematic illustration of the toothed edge and rotational axis.

FIG. 1 schematically shows a tooth part 1 having a rotational axis 11, a central region 12 and a toothed edge 13 for illustrating the boundary angle α. The toothed edge 13 has a boundary angle α therein equal to 90°, i.e., it forms a cylindrical surface with the rotational axis 11 as cylinder axis. The toothed edge 13.1 entered in broken lines has a boundary angle α between 0° and 90° and the toothed edge 13.2 likewise indicated with broken lines has a boundary angle α between 90° and 180°. In these two examples the toothed edge is then a respective part of a surface of a rotational member including the rotational axis 11.

Figure 2:
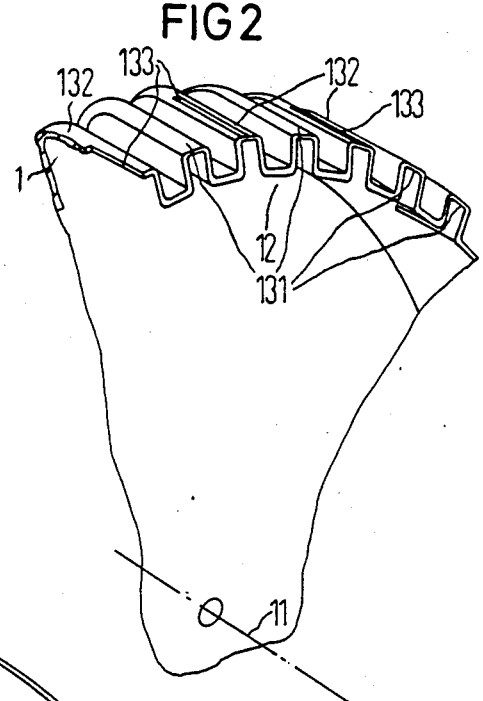
FIG. 2 is a portion of the tooth part of the exemplary embodiment shown in a three-dimensional illustration.

FIG. 2 shows a tooth part 1 including the central region 12 and the toothed edge 13 at a right angle thereto, this toothed edge having teeth 131 equidistantly distributed over its circumference. Accordingly, the toothed edge 13 is a cylindrical surface having the rotational axis 11 as a cylinder axis. Those teeth 131 which have recesses 133 proceeding in the direction of the rotational axis 11 are marker teeth 132.

The tooth part 1 is composed of a circular, planar iron sheet whose edge is bent over at a right angle. The bent-over edge forms a sheet metal cylinder from which the teeth 131 are formed by dilating the material. As seen in the direction of the rotational axis 11, accordingly, respectively two neighboring teeth 131 are connected to a U-shaped sheet metal web. The recesses 133 of the marker teeth 132 are sawn in the direction of the rotational axis 11.

Figure 3:
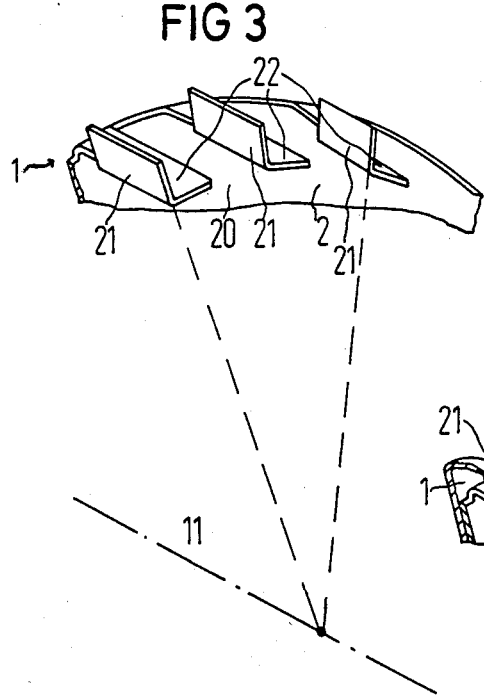
FIG. 3 is a portion of the appertaining marker part shown in a three-dimensional illustration.
Figure 4:
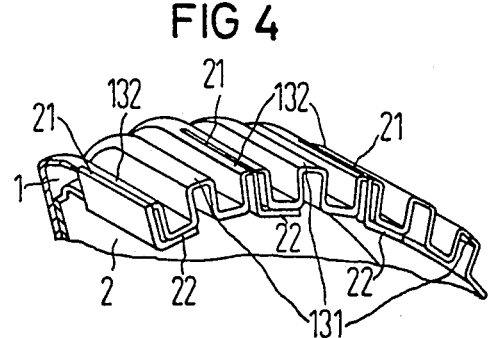
FIG. 4 is a portion of the generator wheel composed of the tooth part and marker part of FIGS. 2 and 3.

FIG. 3 shows a marker part 2 having a circular floor 20 at whose circumference retaining plates 22 projecting therefrom at a right angle are seated, these being the sub-sections of a cylinder including the rotational axis 11 as cylinder axis. Every retaining sheet 22 carries a sheet metal strip 21 projecting radially out at a right angle. The plurality n of retaining sheets 22 having sheet metal strips 21 corresponds to the plurality n of marker teeth 132 of the tooth part 1. The positions of the retaining sheets 22 at the circumference of the floor 20 are thereby selected such that the angular positions of the sheet metal strips 21 correspond to the angular positions of the recesses 133 of the tooth part 1.

The marker part 2 arises from a circular, planar transformer sheet. The transformer sheet is subdivided by an inner circular line around the center which corresponds to the circumferential line of the floor 20. The circular ring formed by the inner circular line and the edge of the transformer sheet is partially punched. In accord with the plurality n as well as in accord with the angular positions for the retaining sheets 22 comprising sheet metal strips 21 (cf., FIG. 3), surface sections thereby remain distributed around the circumferential line of the floor 20, these surface sections being limited by radial edges. In the same work steps, these surface sections each receive a cut-out close to the circumferential line of the floor 20, whereby the depth of the cut-out together with a respective straight line through the center of the transformer sheet and the lowest point of the cut-out defines a sub-area of the surface sections. These